(12) United States Patent
Miura

(10) Patent No.: US 11,698,124 B2
(45) Date of Patent: Jul. 11, 2023

(54) TRANSMISSION AND WORK VEHICLE

(71) Applicant: KOMATSU LTD., Tokyo (JP)

(72) Inventor: Yusuke Miura, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 17/782,328

(22) PCT Filed: Dec. 7, 2020

(86) PCT No.: PCT/JP2020/045392
§ 371 (c)(1),
(2) Date: Jun. 3, 2022

(87) PCT Pub. No.: WO2021/176788
PCT Pub. Date: Sep. 10, 2021

(65) Prior Publication Data
US 2023/0042113 A1     Feb. 9, 2023

(30) Foreign Application Priority Data

Mar. 5, 2020   (JP) .................................. 2020-037675

(51) Int. Cl.
*F16H 47/04*   (2006.01)
*E02F 9/20*    (2006.01)

(52) U.S. Cl.
CPC ............. *F16H 47/04* (2013.01); *E02F 9/202* (2013.01); *F16H 2200/2017* (2013.01)

(58) Field of Classification Search
CPC ............. F16H 47/04; F16H 2200/2017; F16H 2047/045; F16H 47/08; F16H 47/085; F16H 2200/201; F16H 2200/2041; E02F 9/202
See application file for complete search history.

(56) References Cited

U.S. PATENT DOCUMENTS

| 6,203,463 | B1 | 3/2001 | Casey et al. |
| 11,137,052 | B2 * | 10/2021 | Ore .................... F16H 37/084 |
| 2009/0105028 | A1 | 4/2009 | Hiraki et al. |

FOREIGN PATENT DOCUMENTS

| CN | 206234335 U | 6/2017 | |
| CN | 110520651 A * | 11/2019 | ............. B60K 17/08 |

(Continued)

OTHER PUBLICATIONS

The extended European search report for the corresponding European application No. 20923105.9, dated Dec. 2, 2022.

(Continued)

*Primary Examiner* — Justin Holmes
(74) *Attorney, Agent, or Firm* — Global IP Counselors, LLP

(57) ABSTRACT

A first gear mechanism is connected to an input shaft. A second gear mechanism is connected to the input shaft. A motor is connected to the first gear mechanism and the second gear mechanism. The motor continuously varies a speed ratio of a first output gear with respect to the input shaft and a speed ratio of a second output gear with respect to the input shaft. A planetary gear mechanism includes a first rotation element, a second rotation element, and a third rotation element. The planetary gear mechanism is rotatable about a first transfer shaft. A first driven gear is rotatable about a second transfer shaft. The first output gear is connected to the first rotation element. The second output gear is connected to the second rotation element through the first driven gear. The output shaft is connected to the third rotation element.

18 Claims, 6 Drawing Sheets

(56) References Cited

FOREIGN PATENT DOCUMENTS

| | | | | |
|---|---|---|---|---|
| DE | 20 2009 007 972 U1 | 5/2010 | | |
| DE | 102004043017 B4 * | 10/2014 | ............ | B60W 10/18 |
| JP | 60-227045 A | 11/1985 | | |
| JP | 2001-200900 A | 7/2001 | | |
| JP | 2006-329244 A | 12/2006 | | |
| JP | 2017-75692 A | 4/2017 | | |
| WO | WO-2012171812 A1 * | 12/2012 | ............ | F16H 3/728 |

OTHER PUBLICATIONS

The International Search Report for the corresponding international application No. PCT/JP2020/045392, dated Feb. 22, 2021.

* cited by examiner

TRANSMISSION AND WORK VEHICLE

CROSS-REFERENCE TO RELATED APPLICATIONS

This application is a U.S. National stage application of International Application No. PCT/JP2020/045392, filed on Dec. 7, 2020. This U.S. National stage application claims priority under 35 U.S.C. § 119(a) to Japanese Patent Application No. 2020-037675, filed in Japan on Mar. 5, 2020, the entire contents of which are hereby incorporated herein by reference.

TECHNICAL FIELD

The present disclosure relates to a transmission and a work vehicle.

BACKGROUND ART

A continuous speed variation-capable transmission, such as a hydraulic mechanical transmission (HMT), is known in the prior art. For example, the transmission in Japanese Patent Laid-open No. 2006-329244 includes a first planetary gear mechanism, a second planetary gear mechanism, a first motor, and a second motor.

An input shaft of the transmission is connected to a sun gear of the first planetary gear mechanism through an FR conversion mechanism A ring gear of the first planetary gear mechanism is connected to a carrier of the second planetary gear mechanism through a clutch. A ring gear of the second planetary gear mechanism is connected to an output shaft. The first motor is connected to a carrier of the first planetary gear mechanism The second motor is connected to the ring gear of the first planetary gear mechanism The rotation speeds of the first motor and the second motor are controlled in the transmission in Japanese Patent Laid-open No. 2006-329244 whereby the speed ratio ofthe output shaft with respect to the input shaft is varied in a continuous manner.

SUMMARY

In Japanese Patent Laid-open No. 2006-329244, the rotation speed of the first motor or the second motor is set to zero when the vehicle speed is zero while the first motor or the second motor is connected to the output shaft through the first planetary gear mechanism or the second planetary gear mechanism In this case, leakage of hydraulic fluid in the motors increases thereby reducing the energy efficiency of the transmission An object of the present disclosure is to improve energy efficiency in a transmission including a continuous speed variation mechanism A transmission according to a first aspect of the present disclosure includes a continuous speed variation mechanism, a first transfer shaft, a planetary gear mechanism, a second transfer shaft, a first driven gear, and an output shaft. The continuous speed variation mechanism includes an input shaft, a first gear mechanism, a first output gear, a second gear mechanism, a second output gear, and a motor. The first gear mechanism is connected to the input shaft. The first output gear is connected to the first gear mechanism The second gear mechanism is connected to the input shaft. The second output gear is connected to the second gear mechanism The motor is connected to the first gear mechanism and the second gear mechanism The motor continuously varies the speed ratio of the first output gear with respect to the input shaft and the speed ratio of the second output gear with respect to the input shaft. The planetary gear mechanism includes a first rotation element, a second rotation element, and a third rotation element. The planetary gear mechanism is rotatable about the first transfer shaft. The first driven gear is rotatable about the second transfer shaft. The first output gear is connected to the first rotation element. The second output gear is connected to the second rotation element through the first driven gear. The output shaft is connected to the third rotation element.

A work vehicle according to another aspect of the present disclosure includes the above-mentioned transmission The rotation from the continuous speed variation mechanism in the transmission according to the present disclosure is output separately into the first output gear and the second output gear. The rotation from the first output gear is transmitted to the first rotation element of the planetary gear mechanism The rotation from the second output gear is transmitted to the second rotation element of the planetary gear mechanism through the first driven gear. The rotation from the first output gear and the rotation from the second output gear are combined in the planetary gear mechanism and transmitted to the output shaft. As a result, even if the rotation speed of the output shaft is zero, the rotation of the motor can be assured due to the rotation of the first output gear and the rotation of the second output gear canceling each other out. Consequently, energy efficiency of the transmission can be improved.

DESCRIPTION OF EMBODIMENTS

Figure 1:
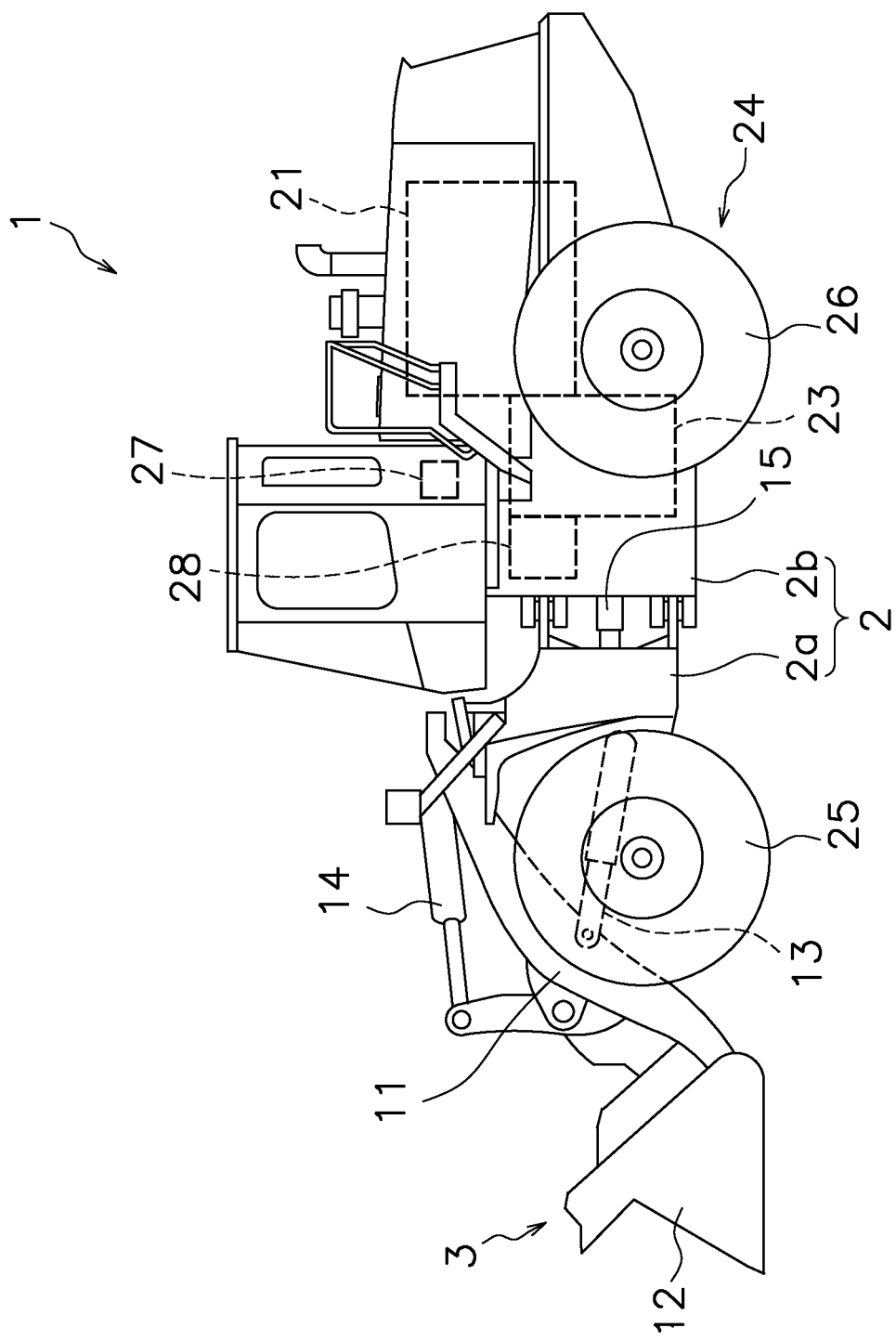
FIG. 1 is a side view of a work vehicle according to an embodiment

Embodiments of the present invention will be explained in detail with reference to the drawings. FIG. 1 is a side view of a work vehicle 1 according to an embodiment of the present disclosure. As illustrated in FIG. 1, the work vehicle 1 includes a vehicle body 2 and a work implement 3. The vehicle body 2 includes a front vehicle body 2a and a rear vehicle body 2b. The rear vehicle body 2b is connected so as to turn to the left and right with respect to the front vehicle body 2a The front vehicle body 2a and the rear vehicle body 2b are coupled by a hydraulic cylinder 15. The hydraulic cylinder 15 extends and contracts whereby the front vehicle body 2a turns to the left and right with respect to the rear vehicle body 2b.

The work implement 3 is used for work, such as excavation. The work implement 3 is attached to the front vehicle body 2a. The work implement 3 includes a boom 11, a bucket 12, and hydraulic cylinders 13 and 14. The hydraulic cylinders 13 and 14 extend and contract thereby actuating the boom 11 and the bucket 12.

The work vehicle 1 includes an engine 21, a transmission 23, and a travel device 24. The engine 21 is an internal combustion engine, such as a diesel engine. The transmission 23 is connected to the engine 21. The transmission is configured to vary the transmission gear ratio in a continuous manner The travel device 24 causes the work vehicle 1 to travel. The travel device 24 includes front wheels 25 and rear wheels 26. The front wheels 25 are provided to the front vehicle body 2a The rear wheels 26 are provided to the rear vehicle body 2b. The front wheels 25 and the rear wheels 26 are connected to the transmission 23 through axles, which are not illustrated.

The work vehicle 1 includes a hydraulic pump 28. The hydraulic pump 28 is connected to the engine 21. The hydraulic pump 28 is driven by the engine 21 and discharges hydraulic fluid. The hydraulic fluid discharged from the hydraulic pump 28 is supplied to the above-mentioned hydraulic cylinders 13 to 15. The work vehicle 1 includes a controller 27. The controller 27 includes, for example, a processor and a memory. The controller 27 controls the engine 21 and the transmission 23.

Figure 2:
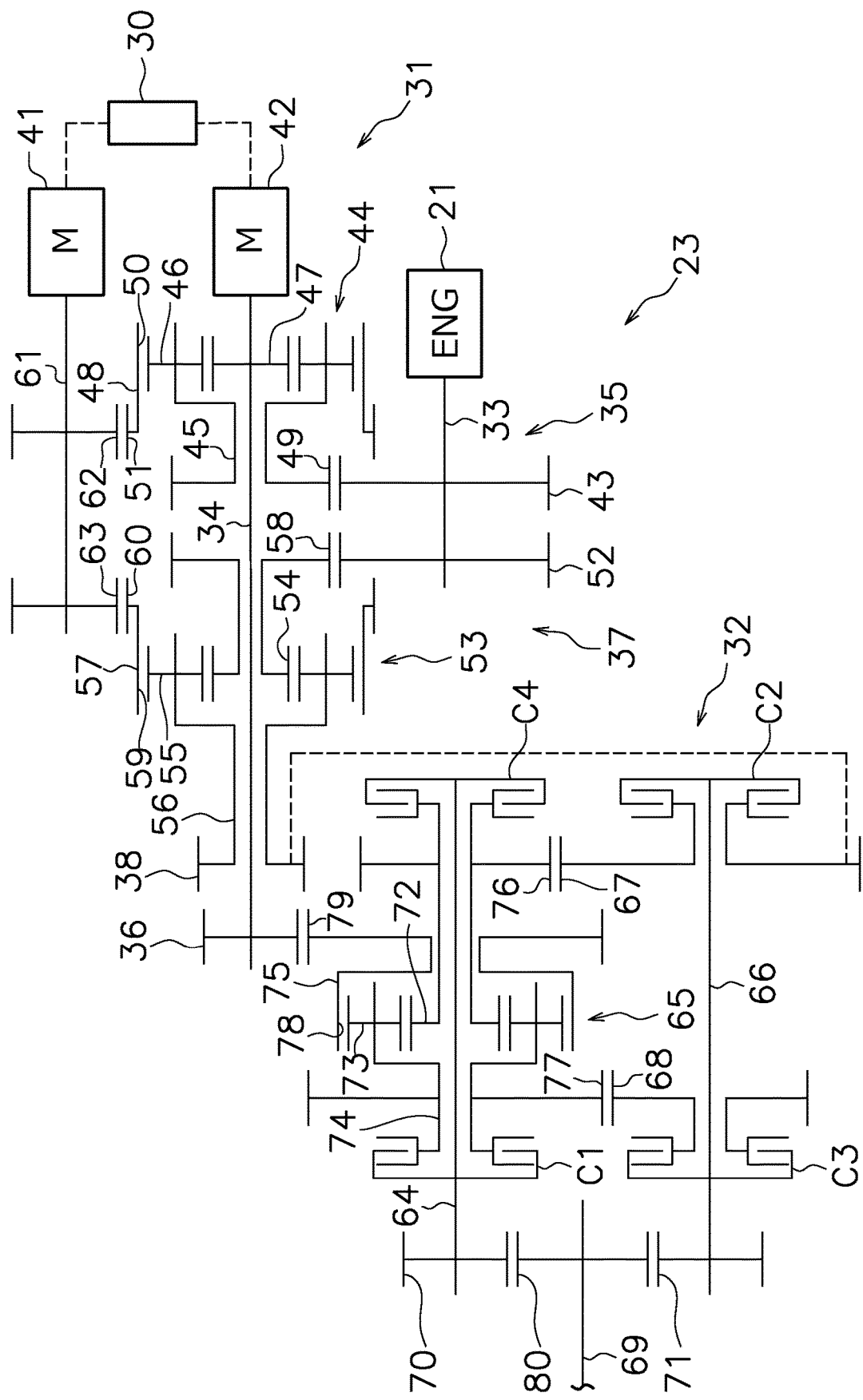
FIG. 2 is a skeleton view of a transmission according to the embodiment.

FIG. 2 is a skeleton view depicting a configuration of the transmission 23. As illustrated in FIG. 2, the transmission 23 includes a continuous speed variation mechanism 31 and a transfer mechanism 32. The continuous speed variation mechanism 31 is connected to the engine 21. The continuous speed variation mechanism 31 includes an input shaft 33, an intermediate shaft 34, a first gear mechanism 35, a first output gear 36, a second gear mechanism 37, a second output gear 38, a first motor 41, and a second motor 42.

The input shaft 33 is connected to the engine 21. The intermediate shaft 34 is disposed eccentrically from the input shaft 33. The first gear mechanism 35 is connected to the input shaft 33. The first output gear 36 is connected to the first gear mechanism 35. The second gear mechanism 37 is connected to the input shaft 33. The second output gear 38 is connected to the second gear mechanism 37.

The first gear mechanism 35 includes a first input gear 43 and a first planetary gear mechanism 44. The first input gear 43 is coupled to the input shaft 33. The first planetary gear mechanism 44 is disposed coaxially with the intermediate shaft 34. The first planetary gear mechanism 44 is rotatable about the intermediate shaft 34. The first planetary gear mechanism 44 includes a first carrier 45, a plurality of first planetary gears 46, a first sun gear 47, and a first ring gear 48. The first carrier 45 is rotatable relative to the intermediate shaft 34. The first carrier 45 is coupled to a gear 49. The gear 49 meshes with the first input gear 43. The first carrier 45 is connected to the first input gear 43 through the gear 49.

The first planetary gears 46 are rotatably held on the first carrier 45. The first planetary gears 46 are configured to revolve about the intermediate shaft 34 due to the rotation of the first carrier 45 about the intermediate shaft 34. The first sun gear 47 meshes with the first planetary gears 46 and is connected to the first planetary gears 46. The first sun gear 47 is coupled to the intermediate shaft 34. The first sun gear 47 rotates with the intermediate shaft 34. The first ring gear 48 is connected to the first planetary gears 46. The first ring gear 48 includes an internal gear 50 and an external gear 51. The internal gear 50 of the first ring gear 48 meshes with the first planetary gears 46.

The second gear mechanism 37 includes a second input gear 52 and a second planetary gear mechanism 53. The second input gear 52 is coupled to the input shaft 33. The second planetary gear mechanism 53 is disposed coaxially with the intermediate shaft 34. The second planetary gear mechanism 53 is rotatable about the intermediate shaft 34. The second planetary gear mechanism 53 includes a second sun gear 54, a plurality of second planetary gears 55, a second carrier 56, and a second ring gear 57.

The second sun gear 54 is coupled to a gear 58. The gear 58 meshes with the second input gear 52. The second sun gear 54 is connected to the second input gear 52 through the gear 58. The second sun gear 54 is rotatable about the intermediate shaft 34. The second sun gear 54 is rotatable relative to the intermediate shaft 34.

The second planetary gears 55 mesh with the second sun gear 54 and are connected to the second sun gear 54. The second planetary gears 55 are rotatably held on the second carrier 56. The second carrier 56 is rotatable about the intermediate shaft 34. The second carrier 56 is rotatable relative to the intermediate shaft 34. The second planetary gears 55 are configured to revolve about the intermediate shaft 34 due to the rotation of the second carrier 56 about the intermediate shaft 34. The second ring gear 57 is connected to the second planetary gears 55. The second ring gear 57 includes an internal gear 59 and an external gear 60. The internal gear 59 of the second ring gear 57 meshes with the second planetary gears 55.

The first motor 41 is a hydraulic pump/motor. A rotating shaft 61 of the first motor 41 is disposed eccentrically from the intermediate shaft 34. A first motor gear 62 and a second motor gear 63 are coupled to the rotating shaft 61 of the first motor 41. The first motor gear 62 meshes with the external gear 51 of the first ring gear 48. The first ring gear 48 is connected to the rotating shaft 61 of the first motor 41 through the first motor gear 62. The second motor gear 63 meshes with the external gear 60 of the second ring gear 57. The second ring gear 57 is connected to the rotating shaft 61 of the first motor 41 through the second motor gear 63.

The second motor 42 is a hydraulic pump/motor. The second motor 42 is connected to the first motor 41 through a hydraulic circuit 30. The second motor 42 is disposed coaxially with the intermediate shaft 34. A rotating shaft of the second motor 42 is coupled directly to the intermediate shaft 34. The first planetary gear mechanism 44 is disposed between the second motor 42 and the second planetary gear mechanism 53 in the direction in which the intermediate shaft 34 extends.

When the first motor 41 functions as a pump and discharges hydraulic fluid, the second motor 42 functions as a motor and is driven by the hydraulic fluid from the first motor 41. Conversely, when the second motor 42 functions as a pump and discharges hydraulic fluid, the first motor 41 functions as a motor and is driven by the hydraulic fluid from the second motor 42.

The first output gear 36 is disposed coaxially with the intermediate shaft 34. The first output gear 36 is coupled to the intermediate shaft 34. The first output gear 36 is connected to the first sun gear 47 through the intermediate shaft 34. The first output gear 36 rotates with the intermediate shaft 34. The second output gear 38 is disposed coaxially with the intermediate shaft 34. The second output gear 38 is disposed coaxially with the first output gear 36. The second output gear 38 is coupled to the second carrier 56. The second output gear 38 is rotatable with the second carrier 56 about the intermediate shaft 34. The second output gear 38 is rotatable relative to the intermediate shaft 34.

The capacity and/or the discharge pressure of the first motor 41 is controlled by the controller 27. The controller 27 controls the rotation speed of the first motor 41. Consequently, the first motor 41 continuously varies the speed ratio of the first output gear 36 with respect to the input shaft 33 and the speed ratio of the second output gear 38 with respect to the input shaft 33. The capacity and/or the discharge pressure of the second motor 42 is controlled by the controller 27. The controller 27 controls the rotation speed of the second motor 42. Consequently, the second motor 42 continuously varies the speed ratio of the first output gear 36 with respect to the input shaft 33 and the speed ratio of the second output gear 38 with respect to the input shaft 33.

The transfer mechanism 32 is connected to the continuous speed variation mechanism 31 and the travel device 24. The transfer mechanism 32 transmits driving power from the continuous speed variation mechanism 31 to the travel device 24. The transfer mechanism 32 includes a first transfer shaft 64, a third planetary gear mechanism 65, a second transfer shaft 66, a first driven gear 67, a second driven gear 68, and an output shaft 69. In addition, the transfer mechanism 32 includes a first clutch C1, a second clutch C2, a third clutch C3, and a fourth clutch C4.

The first transfer shaft 64 is disposed eccentrically from the intermediate shaft 34. A first transfer gear 70 is coupled to the first transfer shaft 64. The first transfer gear 70 rotates with the first transfer shaft 64.

The second transfer shaft 66 is disposed eccentrically from the intermediate shaft 34. The second transfer shaft 66 is disposed eccentrically from the first transfer shaft 64. A second transfer gear 71 is coupled to the second transfer shaft 66. The second transfer gear 71 rotates with the second transfer shaft 66.

The third planetary gear mechanism 65 is disposed coaxially with the first transfer shaft 64. The third planetary gear mechanism 65 is rotatable about the first transfer shaft 64. The third planetary gear mechanism 65 includes a third sun gear 72, a plurality of third planetary gears 73, a third carrier 74, and a third ring gear 75. The third sun gear 72 is coupled to a gear 76. The gear 76 rotates with the third sun gear 72.

The third sun gear 72 is rotatable relative to the first transfer shaft 64. The third sun gear 72 is connected to the first transfer shaft 64 through the fourth clutch C4. The fourth clutch C4 couples the third sun gear 72 to the first transfer shaft 64 in an engaged state. Therefore, the third sun gear 72 rotates with the first transfer shaft 64 while the fourth clutch C4 is in the engaged state. The fourth clutch C4 uncouples the third sun gear 72 from the first transfer shaft 64 in a disengaged state. Therefore, the third sun gear 72 is rotatable idly with respect to the first transfer shaft 64 while the fourth clutch C4 is in the disengaged state.

The third planetary gears 73 mesh with the third sun gear 72 and are connected to the third sun gear 72. The third planetary gears 73 are rotatably held on the third carrier 74. The third carrier 74 is rotatable about the first transfer shaft 64. The third planetary gears 73 are configured to revolve about the first transfer shaft 64 due to the rotation of the third carrier 74 about the first transfer shaft 64. The third carrier 74 is coupled to a gear 77. The gear 77 rotates with the third carrier 74.

The third carrier 74 is rotatable relative to the first transfer shaft 64. The third carrier 74 is connected to the first transfer shaft 64 through the first clutch C1. The first clutch C1 couples the third carrier 74 to the first transfer shaft 64 in an engaged state. Therefore, the third carrier 74 rotates with the first transfer shaft 64 while the first clutch C1 is in the engaged state. The first clutch C1 uncouples the third carrier 74 from the first transfer shaft 64 in a disengaged state. Therefore, the third carrier 74 is rotatable idly with respect to the first transfer shaft 64 while the first clutch C1 is in the disengaged state.

The third ring gear 75 is connected to the third planetary gears 73. The third ring gear 75 is connected to the first output gear 36. The third ring gear 75 includes an internal gear 78 and an external gear 79. The internal gear 78 of the third ring gear 75 meshes with the third planetary gears 73. The external gear 79 of the third ring gear 75 meshes with the first output gear 36.

The first driven gear 67 is disposed coaxially with the second transfer shaft 66. The first driven gear 67 is rotatable relative to the second transfer shaft 66. The first driven gear 67 meshes with the second output gear 38. The first driven gear 67 is connected to the second output gear 38. The first driven gear 67 meshes with the gear 76. The first driven gear 67 is connected to the third sun gear 72 through the gear 76.

The first driven gear 67 is connected to the second transfer shaft 66 through the second clutch C2. The second clutch C2 couples the first driven gear 67 to the second transfer shaft 66 in an engaged state. Therefore, the first driven gear 67 rotates with the second transfer shaft 66 while the second clutch C2 is in the engaged state. The second clutch C2 uncouples the first driven gear 67 from the second transfer shaft 66 in a disengaged state. Therefore, the first driven gear 67 is rotatable idly with respect to the second transfer shaft 66 while the second clutch C2 is in the disengaged state.

The second driven gear 68 is disposed coaxially with the second transfer shaft 66. The second driven gear 68 is rotatable relative to the second transfer shaft 66. The second driven gear 68 meshes with the gear 77. The second driven gear 68 is connected to the third carrier 74 through the gear 77.

The second driven gear 68 is connected to the second transfer shaft 66 through the third clutch C3. The third clutch C3 couples the second driven gear 68 to the second transfer shaft 66 in an engaged state. Therefore, the second driven gear 68 rotates with the second transfer shaft 66 while the third clutch C3 is in the engaged state. The third clutch C3 uncouples the second driven gear 68 from the second transfer shaft 66 in a disengaged state. Therefore, the second driven gear 68 is rotatable idly with respect to the second transfer shaft 66 while the third clutch C3 is in the disengaged state.

The output shaft 69 is connected to the travel device 24. The output shaft 69 is disposed eccentrically from the first transfer shaft 64 and the second transfer shaft 66. The output shaft 69 is disposed eccentrically from the intermediate shaft 34. A gear 80 is coupled to the output shaft 69. The gear 80 meshes with the first transfer gear 70 and the second transfer gear 71. The output shaft 69 is connected to the first transfer shaft 64 through the gear 80 and the first transfer gear 70. The output shaft 69 is connected to the second transfer shaft 66 through the gear 80 and the second transfer gear 71.

A transmission path of the driving power in the transmission 23 is explained next. The controller 27 switches the transmission path in the transmission 23 in accordance with the vehicle speed. The controller 27 switches the transmission path in the transmission 23 in accordance with the travel direction. The controller 27 selects a mode corresponding to the vehicle speed and the travel direction from a plurality of control modes that define transmission paths. The plurality of control modes includes a forward low-speed mode, a forward high-speed mode, a reverse low-speed mode, and a reverse high-speed mode.

Figure 3:
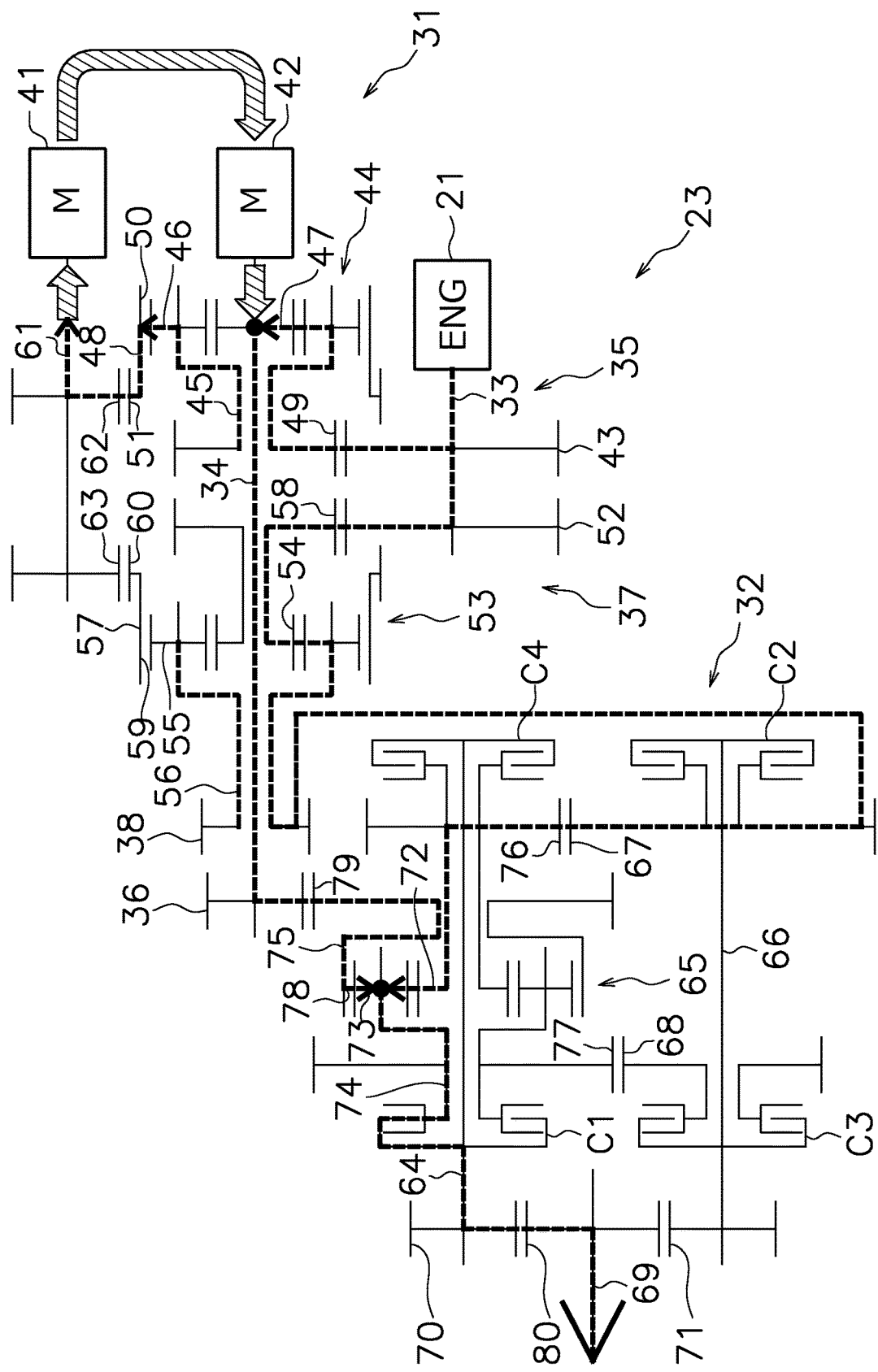
FIG. 3 is a skeleton view of the transmission depicting a transmission path during a forward low-speed mode.

FIG. 3 is a view illustrating a transmission path in the forward low-speed mode. The controller 27 sets the control mode to the forward low-speed mode while the travel direction is forward and the vehicle speed is in a range from zero to a first threshold. As illustrated in FIG. 3, in the forward low-speed mode, the controller 27 sets the first clutch C1 to the engaged state and sets the second to fourth clutches C2 to C4 to the disengaged states. In this case, the driving power from the engine 21 is transmitted from the input shaft 33 to the first motor 41 through the first input gear 43, the gear 49, the first carrier 45, the first planetary gears 46, the first ring gear 48, and the first motor gear 62. The first motor 41 functions as a pump and discharges hydraulic fluid. The second motor 42 is driven by the hydraulic fluid discharged by the first motor 41 and functions as a motor. The second motor 42 causes the first sun gear 47 and the intermediate shaft 34 to rotate and, as a result, the first output gear 36 rotates.

In addition, the driving power from the engine 21 is transmitted from the input shaft 33 to the second output gear 38 through the second input gear 52, the gear 58, the second sun gear 54, the second planetary gears 55, and the second carrier 56. As a result, the second output gear 38 rotates.

The driving power from the first output gear 36 is transmitted to the third planetary gears 73 through the external gear 79 and the third ring gear 75. The driving power from the second output gear 38 is transmitted to the third planetary gears 73 through the first driven gear 67, the gear 76, and the third sun gear 72. Therefore, the driving power from the first output gear 36 and the driving power from the second output gear 38 are combined at the third planetary gear mechanism 65. The combined driving power is transmitted to the output shaft 69 through the third carrier 74, the first clutch C1, the first transfer shaft 64, the first transfer gear 70, and the gear 80.

The controller 27 controls the outputs of the first motor 41 and the second motor 42 so that the speed ratio of the transmission 23 increases in accordance with an increase in the vehicle speed. The speed ratio of the transmission 23 is the rotation speed of the output shaft 69 with respect to the rotation speed of the input shaft 33. The controller 27 controls the outputs of the first motor 41 and the second motor 42 so that the speed ratio varies in a continuous manner in accordance with the vehicle speed.

In the forward low-speed mode, the rotation speed of the third carrier 74 becomes zero while the rotation speed of the first motor 41 is a first rotation speed and the rotation speed of the second motor 42 is a second rotation speed. The first rotation speed and the second rotation speed are greater than zero. While the rotation speed of the first motor 41 is the first rotation speed and the rotation speed of the second motor 42 is the second rotation speed, the product of the rotation of the third ring gear 75 due to the driving power from the first output gear 36 and the number of teeth of the third ring gear 75, and the product of the rotation of the third sun gear 72 due to the driving power from the second output gear 38 and the number of teeth of the third sun gear 72 are in opposite directions and are the same size. As a result, the rotation of the third ring gear 75 due to the driving power from the first output gear 36 and the rotation of the third sun gear 72 due to the driving power from the second output gear 38 cancel each other out and the third planetary gears 73 rotate on their own axis but do not revolve. As a result, the third carrier 74 does not rotate and remains stationary.

Even if the first motor 41 and the second motor 42 are rotating in the work vehicle according to the present embodiment as described so far, the rotation of the output shaft 69 can be set to zero. As a result, the state of the first motor 41 and the second motor 42 rotating can be maintained even if the work vehicle has stopped. Consequently, energy efficiency of the transmission 23 can be improved. The first rotation speed and the second rotation speed may be determined by taking into account a balance between the energy efficiency and the fuel consumption of the first motor 41 and the second motor 42.

Figure 4:
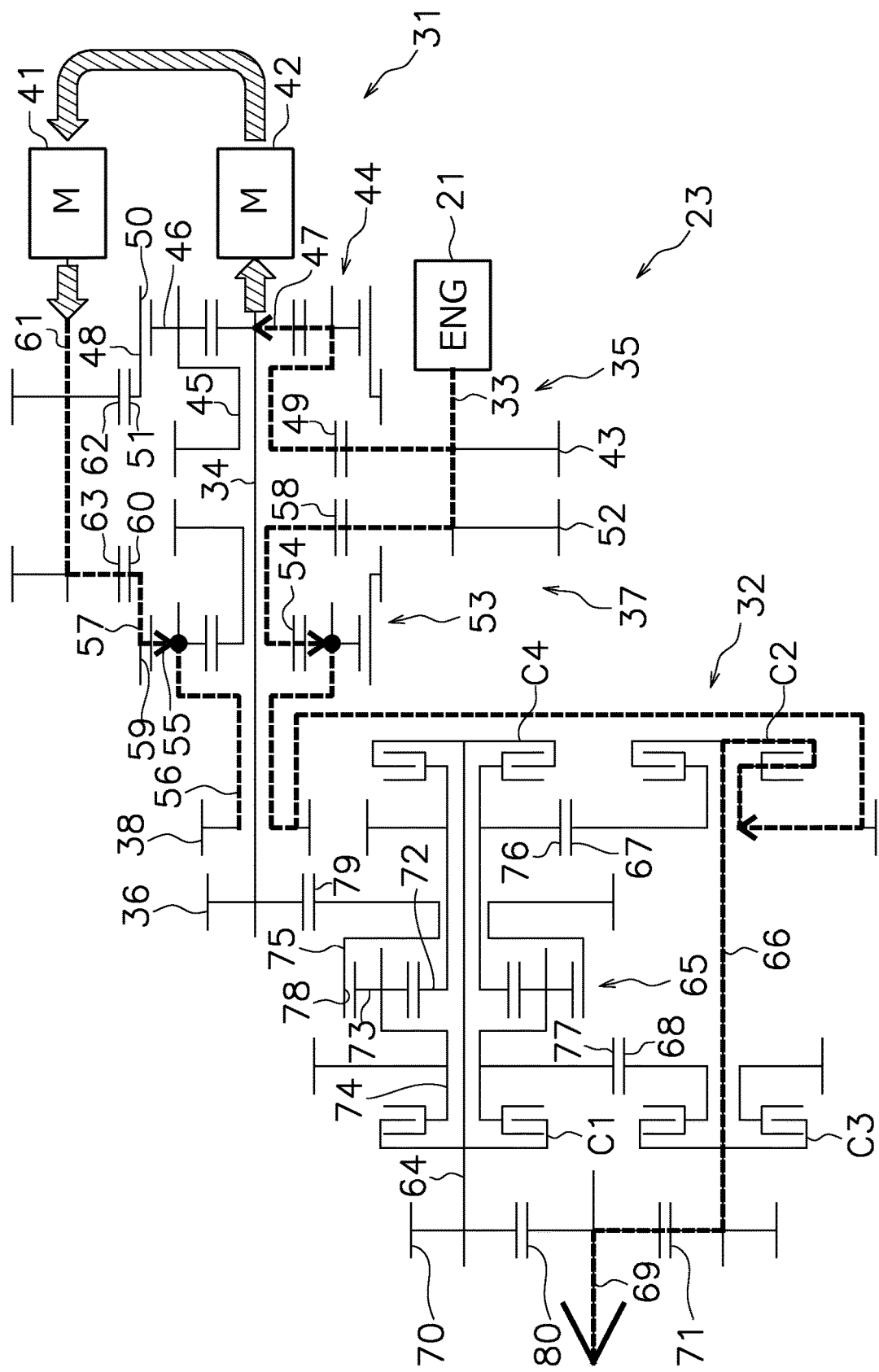
FIG. 4 is a skeleton view of the transmission depicting a transmission path during a forward high-speed mode.

When the vehicle speed equals or exceeds the first threshold while traveling forward, the controller 27 switches the control mode from the forward low-speed mode to the forward high-speed mode. FIG. 4 is a view illustrating a transmission path in the forward high-speed mode.

As illustrated in FIG. 4, in the forward high-speed mode, the controller 27 sets the second clutch C2 to the engaged state and sets the first, third, and fourth clutches C1, C3, and C4 to the disengaged states. In this case, the driving power from the engine 21 is transmitted from the input shaft 33 to the second motor 42 through the first input gear 43, the gear 49, the first planetary gears 46, and the first sun gear 47. The second motor 42 functions as a pump and discharges hydraulic fluid. The first motor 41 is driven by the hydraulic fluid discharged by the second motor 42 and functions as a motor. The driving power from the first motor 41 is transmitted to the second planetary gears 55 through the second motor gear 63 and the second ring gear 57.

The driving power from the first input gear 43 and the driving power from the second input gear 52 are combined at the second planetary gear mechanism 53. The combined driving power is transmitted to the output shaft 69 through the second output gear 38, the first driven gear 67, the second clutch C2, the second transfer shaft 66, the second transfer gear 71, and the gear 80.

Figure 5:
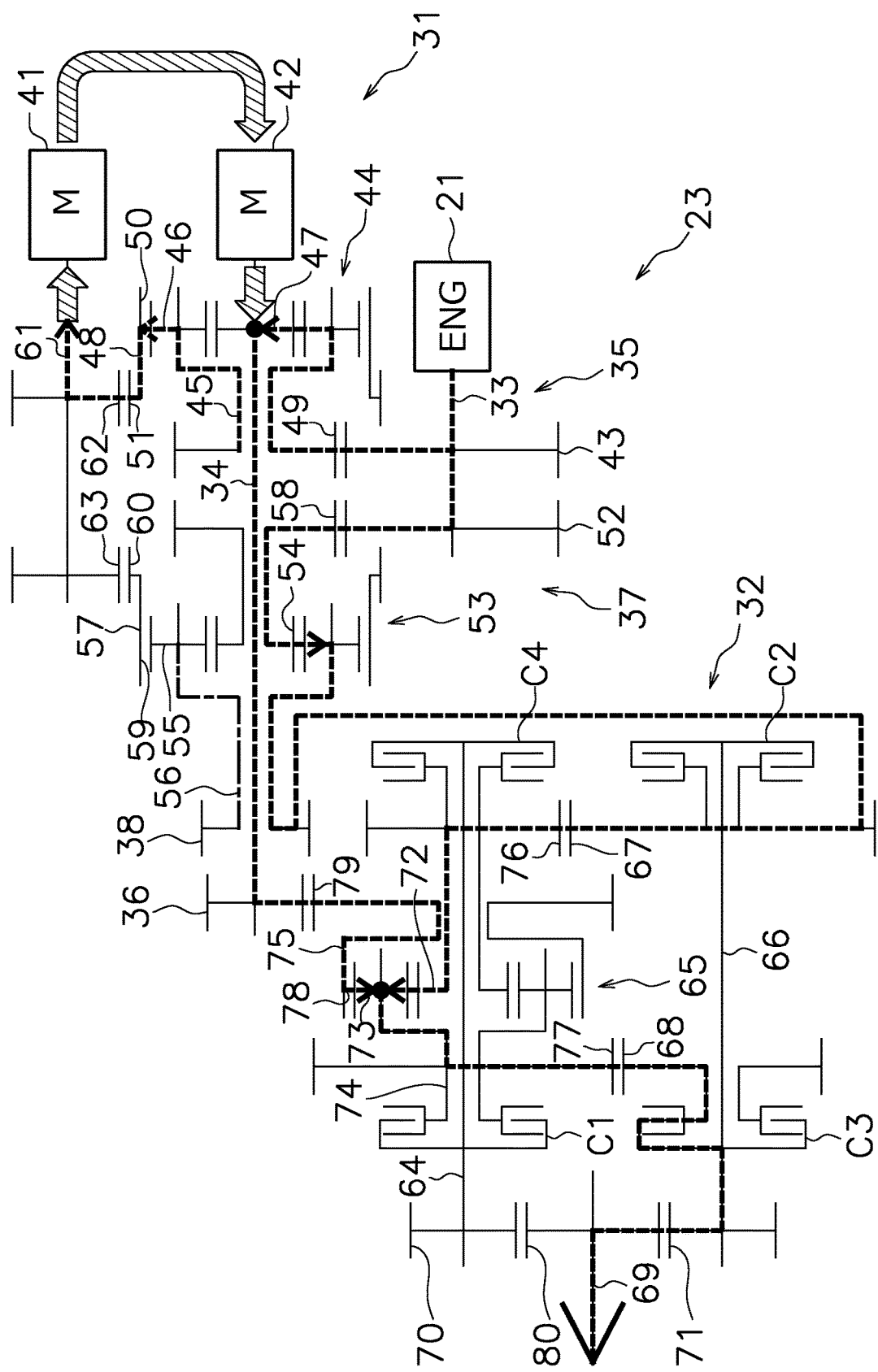
FIG. 5 is a skeleton view of the transmission depicting a transmission path during a reverse low-speed mode.

FIG. 5 is a view illustrating a transmission path in the reverse low-speed mode. The controller 27 sets the control mode to the reverse low-speed mode while the travel direction is reverse and the vehicle speed is in a range from zero to a second threshold. As illustrated in FIG. 5, in the reverse low-speed mode, the controller 27 sets the third clutch C3 to the engaged state and sets the first, second, and fourth clutches C1, C2, and C4 to the disengaged states. In this case, the transmission path from the engine 21 through the continuous speed variation mechanism 31 to the third planetary gear mechanism 65 is the same as the forward low-speed mode. The driving power from the first output gear 36 and the driving power from the second output gear 38 are combined at the third planetary gear mechanism 65 in the same way as the forward low-speed mode.

The combined driving power in the reverse low-speed mode is transmitted to the output shaft 69 through the third carrier 74, the gear 77, the second driven gear 68, the third clutch C3, the second transfer shaft 66, the second transfer gear 71, and the gear 80. In the reverse low-speed mode as well, the rotation speed of the third carrier 74 becomes zero while the rotation speed of the first motor 41 is the first rotation speed and the rotation speed of the second motor 42 is the second rotation speed in the same way as the forward low-speed mode. Therefore, the rotation of the output shaft 69 can also be set to zero while the first motor 41 and the second motor 42 are rotating in the reverse low-speed mode. As a result, the state of the first motor 41 and the second motor 42 rotating can be maintained even if the work vehicle has stopped.

Figure 6:
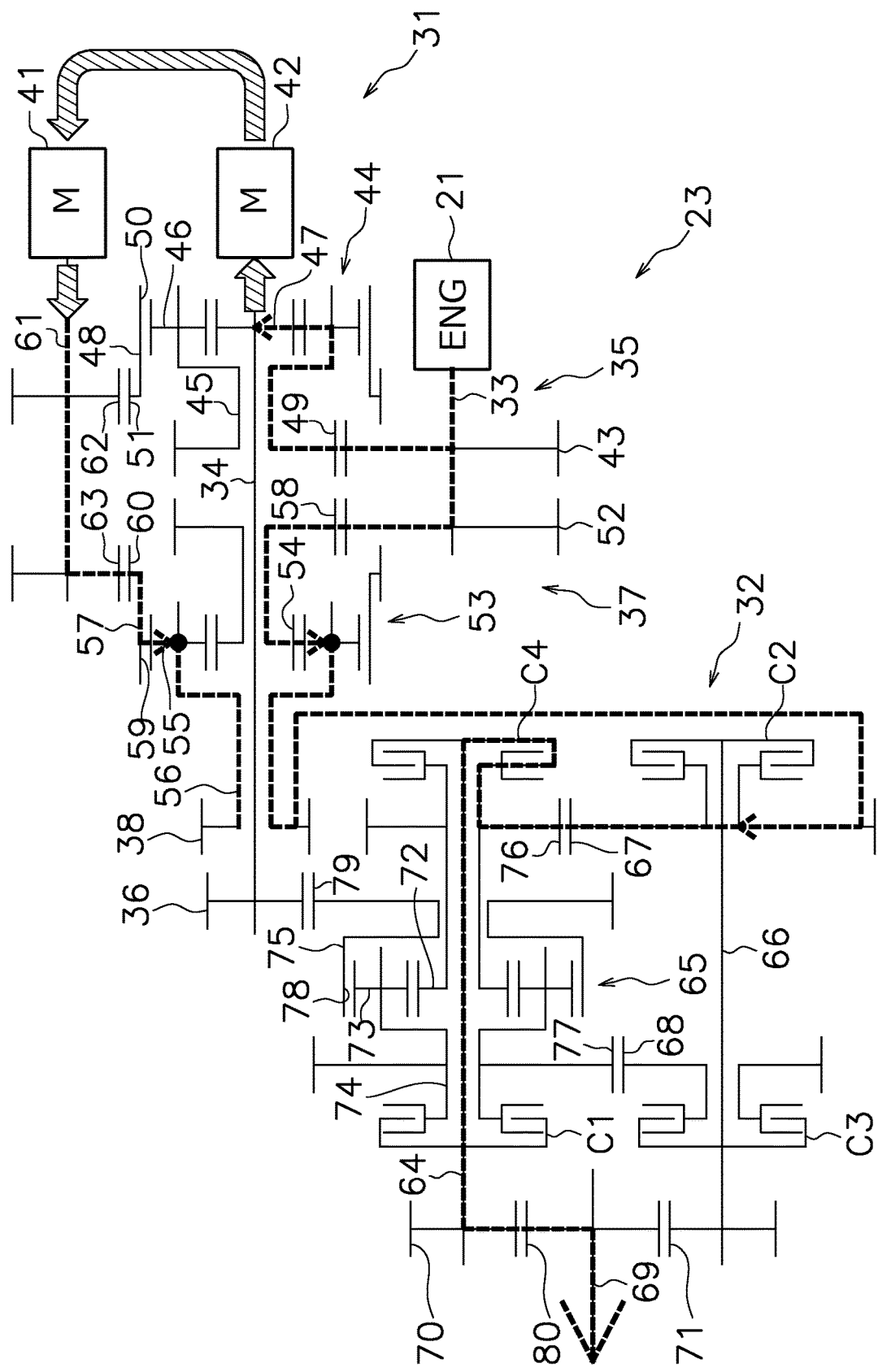
FIG. 6 is a skeleton view of the transmission depicting a transmission path during a reverse high-speed mode.

When the vehicle speed equals or exceeds the second threshold while traveling in reverse, the controller 27 switches the control mode from the reverse low-speed mode to the reverse high-speed mode. FIG. 6 is a view illustrating a transmission path in the reverse high-speed mode.

As illustrated in FIG. 6, in the reverse high-speed mode, the controller 27 sets the fourth clutch C4 to the engaged state and sets the first to third clutches C1 to C3 to the disengaged states. In this case, the transmission path from the engine 21 to the second planetary gear mechanism 53 is the same as the forward high-speed mode. The driving power from the first input gear 43 and the driving power from the second input gear 52 are combined at the second planetary gear mechanism 53. The combined driving power is transmitted to the output shaft 69 through the second output gear 38, the first driven gear 67, the gear 76, the fourth clutch C4, the first transfer shaft 64, the first transfer gear 70, and the gear 80.

Although an embodiment of the present invention has been described so far, the present invention is not limited to the above embodiment and various modifications may be made within the scope of the invention. The work vehicle 1 is not limited to a wheel loader and may be another vehicle, such as a bulldozer or a hydraulic excavator.

The configuration of the transmission 23 may be changed. For example, the connection relationships between the rotation elements of the first planetary gear mechanism 44 and the rotation elements of the second planetary gear mechanism 53 may be changed. The connection relationships between the rotation elements of the first planetary gear mechanism 44 and the first and second motors 41 and 42 may be changed. The connection relationships between the rotation elements of the first planetary gear mechanism 44 and the first output gear 36 may be changed.

The connection relationships between the rotation elements ofthe second planetary gear mechanism 53 and the first and second motors 41 and 42 may be changed. The connection relationships between the rotation elements of the second planetary gear mechanism 53 and the second output gear 38 may be changed. The connection relationship between the third planetary gear mechanism 65 and the first transfer shaft 64 may be changed. The connection relationship between the third planetary gear mechanism 65 and the first output gear 36 may be changed. The connection relationship between the third planetary gear mechanism 65 and the second output gear 38 may be changed.

The dispositions of the clutches C1 to C4 may be changed. The first motor 41 and the second motor 42 are not limited to hydraulic pump/motors and may be electric generator/motors. The control modes are not limited to the above embodiment and may be changed. For example, the transmission paths illustrated in FIG. 5 and FIG. 6 may be the control modes for forward travel. The transmission paths illustrated in FIG. 3 and FIG. 4 may be the control modes for reverse travel.

According to the present disclosure, energy efficiency can be improved in a transmission including a continuous speed variation mechanism

The invention claimed is:
1. A transmission comprising:
a continuous speed variation mechanism including
an input shaft,
a first gear mechanism connected to the input shaft,
a first output gear connected to the first gear mechanism,
a second gear mechanism connected to the input shaft,
a second output gear connected to the second gear mechanism, and
a motor that is connected to the first gear mechanism and the second gear mechanism and continuously varies a speed ratio of the first output gear with respect to the input shaft and a speed ratio of the second output gear with respect to the input shaft;
a first transfer shaft;
a planetary gear mechanism that includes a first rotation element, a second rotation element, and a third rotation element, and is rotatable about the first transfer shaft;
a second transfer shaft;
a first driven gear that is rotatable about the second transfer shaft; and
an output shaft,
the first output gear being connected to the first rotation element,
the second output gear being connected to the second rotation element through the first driven gear,
the output shaft being connected to the third rotation element, and
while a rotation speed of the motor is a predetermined rotation speed that is greater than zero, a rotation speed of the third rotation element being zero.

2. The transmission according to claim 1, wherein
the first transfer shaft is disposed eccentrically from the second transfer shaft.

3. The transmission according to claim 2, wherein
the continuous speed variation mechanism further includes an intermediate shaft coupled to the first output gear, and
the first transfer shaft is disposed eccentrically from the intermediate shaft.

4. The transmission according to claim 3, wherein
the second transfer shaft is disposed eccentrically from the intermediate shaft.

5. The transmission according to claim 4, wherein
the intermediate shaft is coupled directly to the motor.

6. The transmission according to claim 5, further comprising
a first clutch that couples the first transfer shaft to the third rotation element in an engaged state and uncouples the first transfer shaft from the third rotation element in a disengaged state,
while the first clutch is in the engaged state, the output shaft being connected to the third rotation element through the first transfer shaft.

7. The transmission according to claim 6, further comprising
a second clutch that couples the second transfer shaft to the first driven gear in an engaged state and uncouples the second transfer shaft from the first driven gear in a disengaged state,
while the first clutch is in the disengaged state and the second clutch is in the engaged state, the output shaft being connected to the first driven gear through the second transfer shaft.

8. The transmission according to claim 7, further comprising
a second driven gear that is connected to the third rotation element and is rotatable about the second transfer shaft; and
a third clutch that couples the second transfer shaft to the second driven gear in an engaged state and uncouples the second transfer shaft from the second driven gear in a disengaged state,
while the third clutch is in the engaged state, the output shaft being connected to the third rotation element through the second transfer shaft and the second driven gear.

9. The transmission according to claim 8, further comprising
a fourth clutch that couples the first transfer shaft to the second rotation element in an engaged state and uncouples the first transfer shaft from the second rotation element in a disengaged state,
while the fourth clutch is in the engaged state, the output shaft being connected to the second rotation element through the first transfer shaft.

10. A work vehicle comprising the transmission according to claim 9.

11. A work vehicle comprising the transmission according to claim 1.

12. A transmission comprising:
a continuous speed variation mechanism including
an input shaft,
a first gear mechanism connected to the input shaft,
a first output gear connected to the first gear mechanism,
a second gear mechanism connected to the input shaft,
a second output gear connected to the second gear mechanism, and
a motor that is connected to the first gear mechanism and the second gear mechanism and continuously varies a speed ratio of the first output gear with respect to the input shaft and a speed ratio of the second output gear with respect to the input shaft;
a first transfer shaft;
a planetary gear mechanism that includes a first rotation element, a second rotation element, and a third rotation element, and is rotatable about the first transfer shaft;
a second transfer shaft;
a first driven gear that is rotatable about the second transfer shaft; and
an output shaft,
the first output gear being connected to the first rotation element,
the second output gear being connected to the second rotation element through the first driven gear,
the output shaft being connected to the third rotation element,
the continuous speed variation mechanism further including an intermediate shaft coupled to the first output gear, and
the first transfer shaft being disposed eccentrically from the intermediate shaft.

13. The transmission according to claim 12, wherein
the second transfer shaft is disposed eccentrically from the intermediate shaft.

14. The transmission according to claim 12, wherein
the intermediate shaft is coupled directly to the motor.

15. A transmission comprising:
a continuous speed variation mechanism including
an input shaft,
a first gear mechanism connected to the input shaft,
a first output gear connected to the first gear mechanism,
a second gear mechanism connected to the input shaft,
a second output gear connected to the second gear mechanism, and
a motor that is connected to the first gear mechanism and the second gear mechanism and continuously varies a speed ratio of the first output gear with respect to the input shaft and a speed ratio of the second output gear with respect to the input shaft;
a first transfer shaft;
a planetary gear mechanism that includes a first rotation element, a second rotation element, and a third rotation element, and is rotatable about the first transfer shaft;
a second transfer shaft;
a first driven gear that is rotatable about the second transfer shaft;
an output shaft; and
a first clutch that couples the first transfer shaft to the third rotation element in an engaged state and uncouples the first transfer shaft from the third rotation element in a disengaged state,
the first output gear being connected to the first rotation element, the second output gear being connected to the second rotation element through the first driven gear,
the output shaft being connected to the third rotation element, and
while the first clutch is in the engaged state, the output shaft being connected to the third rotation element through the first transfer shaft.

16. The transmission according to claim 15, further comprising
a second clutch that couples the second transfer shaft to the first driven gear in an engaged state and uncouples the second transfer shaft from the first driven gear in a disengaged state,
while the first clutch is in the disengaged state and the second clutch is in the engaged state, the output shaft being connected to the first driven gear through the second transfer shaft.

17. A transmission comprising:
a continuous speed variation mechanism including
an input shaft,
a first gear mechanism connected to the input shaft,
a first output gear connected to the first gear mechanism,
a second gear mechanism connected to the input shaft,
a second output gear connected to the second gear mechanism, and
a motor that is connected to the first gear mechanism and the second gear mechanism and continuously varies a speed ratio of the first output gear with respect to the input shaft and a speed ratio of the second output gear with respect to the input shaft;
a first transfer shaft;
a planetary gear mechanism that includes a first rotation element, a second rotation element, and a third rotation element, and is rotatable about the first transfer shaft;
a second transfer shaft;
a first driven gear that is rotatable about the second transfer shaft;
an output shaft;
a second driven gear that is connected to the third rotation element and is rotatable about the second transfer shaft; and
a third clutch that couples the second transfer shaft to the second driven gear in an engaged state and uncouples the second transfer shaft from the second driven gear in a disengaged state,
the first output gear being connected to the first rotation element,
the second output gear being connected to the second rotation element through the first driven gear,
the output shaft being connected to the third rotation element, and
while the third clutch is in the engaged state, the output shaft being connected to the third rotation element through the second transfer shaft and the second driven gear.

18. The transmission according to claim 17, further comprising
- a fourth clutch that couples the first transfer shaft to the second rotation element in an engaged state and uncouples the first transfer shaft from the second rotation element in a disengaged state,
- while the fourth clutch is in the engaged state, the output shaft being connected to the second rotation element through the first transfer shaft.

* * * * *